United States Patent [19]

Leeper, Jr.

[11] 3,711,310
[45] Jan. 16, 1973

[54] REPAIR PROCESS FOR ALUMINUM AND MAGNESIUM ARTICLES

[75] Inventor: Henry P. Leeper, Jr., Madison, Conn.

[73] Assignee: United Aircraft Corporation, East Hartford, Conn.

[22] Filed: July 26, 1971

[21] Appl. No.: 164,877

[52] U.S. Cl. ...................117/2, 29/401, 29/527.4, 29/DIG. 39, 117/22, 117/105
[51] Int. Cl. ..............................................B23p 7/00
[58] Field of Search...29/401, 527.2, 527.4, DIG. 39; 117/105, 2, 22

[56] References Cited

UNITED STATES PATENTS

| | | |
|---|---|---|
| 2,588,422 | 3/1952 | Shepard...........................117/105 X |
| 3,004,336 | 10/1961 | Timuska................................29/401 |
| 3,077,659 | 2/1963 | Holzwarth et al. ................117/105 X |
| 3,107,175 | 10/1963 | Cape ...................................117/22 X |
| 3,382,085 | 5/1968 | Wren et al. ........................117/22 X |

Primary Examiner—Charles W. Lanham
Assistant Examiner—Donald C. Reiley, III
Attorney—Richard N. James

[57] ABSTRACT

Damaged articles formed of aluminum or magnesium, including the alloys thereof, are repaired by suitably preparing the damaged area as, for example, grinding away the fault; refilling the prepared area utilizing a plasma spray repair coating comprising aluminum or an aluminum-silicon alloy with a mixture of 10–40 weight percent molybdenum; and subsequently refinishing to dimension, if required.

3 Claims, No Drawings

REPAIR PROCESS FOR ALUMINUM AND MAGNESIUM ARTICLES

BACKGROUND OF THE INVENTION

The present invention relates to the repair of aluminum or magnesium articles in a process incorporating a plasma spray repair coating.

In the production and utilization of articles formed of aluminum or magnesium (including the alloys thereof wherein aluminum and/or magnesium comprise the predominant constituents) minor faults are often generated either in the production process itself or as a result of damage in service. Frequently, the faults are of such nature that repair would be possible if an economical and otherwise satisfactory repair process existed. Conventional repair techniques at best require a two step process, i.e., a bond coat followed by a repair coat. The direct single step plasma spray coating techniques utilizing coating materials identical or galvanically similar to the basis metal have generally been unsatisfactory. And this appears to be true despite the fact that plasma spray coatings of various types have heretofore been referenced in the art, as evidenced, for example, by the patent to Dittrich et al. U.S. Pat. No. 3,436,248.

SUMMARY OF THE INVENTION

This invention contemplates a repair process for aluminum or magnesium articles wherein:

the surface to be repaired, after any necessary machining, is cleaned;

a mixture of powders comprising, by weight, 10–40 percent molybdenum together with 60–90 percent aluminum, or aluminum/silicon alloy containing up to 20 percent silicon, is plasma sprayed on the area to be repaired to effect the necessary buildup; and the part is subsequently processed to finished dimensions.

DESCRIPTION OF THE PREFERRED EMBODIMENTS

In the typical plasma spray coating process a powdered coating material, suspended in a suitable carrier gas, is fed into a chamber in which flowing gas has been excited or heated to extremely high temperatures by an electric arc or oxy-hydrogen or oxy-acetylene flame. Coating particles are heated to plasticity and carried onto the workpiece in the resulting high velocity plasma stream of ionized gas which issues from the nozzle of the specially constructed torch. The usual carrier gas is argon or helium, although for the coating of aluminum or magnesium up to 25 percent by volume hydrogen may be added.

In the typical repair process, the defect to be repaired is removed by appropriate machining techniques except, of course, in the case where the fault is merely the result of undersizing Subsequently, the part is cleaned to remove all dirt, grease and other foreign matter and the surface is prepared for application of the repair coating by grit blasting preferably using nonmetallic grit. Coating on the cleanest possible surface is preferred and coating is normally commenced within at least 2 hours of cleaning and blasting.

Usually the parts are preheated to remove moisture and to minimize thermal shock and thermal expansion effects during the actual coating operation. In coating, however, special care is taken to prevent bulk overheating and during the spraying operation, the average temperature of the part is limited to a maximum of about 400°F.

Coatings of various compositions applied at various plasma power levels have been made, the results of which are summarized in the following tables.

Table I

AMS 4117 Aluminum Alloy To A Repair Coating Thickness Of 0.010–0.012 Inch Thickness

| Plasma Powder | Plasma Power Level (kw) | Bond Strength (psi) 0.010–0.012" Thick Coating |
|---|---|---|
| Pure Al | 10 | 2740 |
| Pure Al | 12 | 2850 |
| Pure Al | 14 | 2650 |
| Pure Al | 16 | 3060 |
| Al+15 w/o Mo | 12 | 4470 |
| Al+15 w/o Mo | 16½ | 6290 |
| Al+27 w/o Mo | 10 | 4440 |
| Al+27 w/o Mo | 16½ | 5230 |
| Al+37 w/o Mo | 10 | 5650 |
| Al+37 w/o Mo | 12 | 4490 |
| Al+37 w/o Mo | 14 | 5250 |
| Al+37 w/o Mo | 16 | 5590 |

Table II

AMS 4375 Magnesium Alloy

| Coating | Bond Strength (Average psi) |
|---|---|
| Pure Aluminum | 1730 |
| Al+15% Mo | 2500 |
| Al–12% Si Alloy | 3670 |
| Al–12% Si Al+15% Mo | 4430 |

The usual acceptable minimum bond strength for repair processes of this nature on aluminum is 3000 p.s.i. As will be noted, the bond strengths of the Al — (15–40)Mo — (0–20)Si repair coatings of the present invention are all considerably in excess of this minimum. Typical powder sizes utilized were −200 mesh for molybdenum and −170 + 325 mesh for the aluminum.

Salt spray tests on coated parts have also been conducted with only minor pitting of the repair area noted in 1,000 hours on AMS 4026 aluminum sheet.

Thus, it has been established that aluminum and magnesium articles may be economically and satisfactorily repaired in a process incorporating but a single plasma spray coating step.

The invention in its broader aspects is not limited to the specific details described but departures may be made therefrom within the scope of the accompanying claims without departing from the principles of the invention and without sacrificing its chief advantages.

What is claimed is:

1. A process utilizing a single spray coating step for the repair of defects in articles formed of aluminum or magnesium, which process comprises the steps of:
   cleaning the surface to be repaired;
   in a single step, plasma spray coating the cleaned surface in order to effect the necessary coating buildup, using a coating mixture which consists of finely divided powders of a composition which consists essentially of, by weight, 10–40 percent molybdenum and 60–90 percent aluminum containing 0–20 percent silicon;

and, subsequently, processing the part to restore it to dimension.

2. The process according to claim 1 wherein:
the article is preheated to a temperature of 200°–400°F. for the plasma spray coating step.

3. The process according to claim 2 wherein:
the bulk temperature of the article during plasma spray coating is limited to 400°F. maximum.

\* \* \* \* \*